United States Patent
Mandre et al.

(10) Patent No.: US 10,242,052 B2
(45) Date of Patent: Mar. 26, 2019

(54) RELATIONAL DATABASE TREE ENGINE IMPLEMENTING MAP-REDUCE QUERY HANDLING

(71) Applicant: Unisys Corporation, Blue Bell, PA (US)

(72) Inventors: Sateesh Mandre, Bangalore (IN); Kumar Swamy BV, Bangalore (IN); Raghavendra Marutirao Banappanavar, Bangalore (IN); Murthy Naik Revananaik, Bangalore (IN); Prabhakar Chintapalli, Bangalore (IN)

(73) Assignee: Unisys Corporation, Blue Bell, PA (US)

( * ) Notice: Subject to any disclaimer, the term of this patent is extended or adjusted under 35 U.S.C. 154(b) by 190 days.

(21) Appl. No.: 13/658,034

(22) Filed: Oct. 23, 2012

(65) Prior Publication Data
US 2014/0032528 A1 Jan. 30, 2014

(51) Int. Cl.
*G06F 17/30* (2006.01)
(52) U.S. Cl.
CPC .............................. *G06F 17/30463* (2013.01)
(58) Field of Classification Search
CPC ................................................ G06F 17/30545
USPC ................................................ 707/718, 770
See application file for complete search history.

(56) References Cited

U.S. PATENT DOCUMENTS

| | | | |
|---|---|---|---|
| 5,913,020 A * | 6/1999 | Rohwer | 714/6.13 |
| 6,775,673 B2 * | 8/2004 | Mahalingam et al. | |
| 2006/0044316 A1 * | 3/2006 | Haghighi | G06T 1/60 345/544 |
| 2006/0206662 A1 * | 9/2006 | Ludwig | G06F 3/0607 711/114 |
| 2007/0162506 A1 * | 7/2007 | Grosman | G06F 17/30584 |
| 2008/0091710 A1 * | 4/2008 | Charlet et al. | 707/102 |
| 2008/0148096 A1 * | 6/2008 | Zarnke | G06F 11/1096 714/6.12 |
| 2008/0319967 A1 * | 12/2008 | Hutchison et al. | 707/4 |
| 2011/0302583 A1 * | 12/2011 | Abadi et al. | 718/102 |

* cited by examiner

*Primary Examiner* — Charles E Lu

(57) ABSTRACT

Methods and systems for processing a database query are disclosed. An example method includes receiving a SQL database query at a database query handling server, and parsing the SQL database query to identify a database and one or more tables and columns identified by the SQL database query. The method also includes determining a query plan based on the parsed database query. At a database engine, and based on the query plan and the identified database, tables and columns, the method further includes identifying a set of data nodes implicated by the identified database, tables and columns, determining a set of reduce operations and levels at which each of the set of map-reduce operations are to execute, and passing the query plan, the set of data nodes, and the map-reduce operations to a map-reduce query execution framework. The map-reduce query framework returns records as query results to the client system.

20 Claims, 10 Drawing Sheets

RELATIONAL DATABASE TREE ENGINE IMPLEMENTING MAP-REDUCE QUERY HANDLING

TECHNICAL FIELD

The present application relates generally to database management techniques, and database query processing. In particular, the present application relates to a relational database tree engine using map-reduce query handling.

BACKGROUND

A database consists of a collection of structured data. For example, in the case of a relational database, such as a SQL database, the database consists of a set of tables, each of which contain data associated with a particular subject. Each table includes columns and rows, with each column representing an attribute of a particular entry in the table, and each row representing a separate entry in the table. Generally, a SQL database, or other relational database, can contain any number of data columns and rows. SQL databases have, over the course of recent history, proven to be a feasible database technology for enterprise data storage. This is in part because the SQL schema provides robust and complex query execution plans to be executed.

However, SQL databases are not without drawbacks. One example where SQL databases prove sub-optimal is when handling large-scale data. In particular, in cases where a database is required to be scalable across multiple computing systems, SQL databases do not work well. For example, currently a SQL database is stored in the form of an MDF file on an NTFS-based file system. MDF files have a particular structure that includes database tables and associated metadata. If a database table grows large, the MDF file containing that table also must grow large, and cannot easily be separated. As the table (and associated MDF file) grows, even queries only to that table can be delayed due to time to build/update indexes into the table. Furthermore, the time to parse the table to satisfy unindexed queries may be unwieldy. Overall, and for a host of reasons, use of MDF files can result in long time delays between when a client application submits a SQL query to the database and when results are ultimately returned.

Beyond SQL and other relational databases, a database can be stored in a variety of different ways, each of which greatly affects the performance of that database. For this reason, in recent history other organizational schemes for data have been attempted. For example, in U.S. Patent Pub. No. 2011/0302151, an implementation is discussed which uses a server that is interfaced to a number of node database management systems. In that implementation, a SQL interface on the server acts as a front-end to a map-reduce database, such as an Apache Hadoop data processing framework. The Apache Hadoop data processing framework then distributes specific, granular portions of the SQL query received at the SQL interface to database management systems located at each data node. In that implementation, each of the database management systems at each node then processes the data, allowing for some parallelism across the nodes. However, even in such a system, each node is limited by the manner in which data is organized at that node. In such cases, each DBMS at each node suffers from the same scalability issues otherwise encountered in a single database; however in this case, since queries may be distributed to one or more nodes, query result return latency is affected by both the time required to transfer data from and among the nodes, as well as being limited to the worst-case response time of the nodes addressed by a single query. Furthermore, in many cases this approach may be cost-prohibitive, since each data node would be required to manage and execute its own database management system, which can involve substantial software and IT administration fees.

For these and other reasons, improvements are desirable.

SUMMARY

In accordance with the following disclosure, the above and other issues are addressed by the following:

In a first aspect, a method for processing a database query is disclosed. The method includes receiving a SQL database query at a database query handling server managing access to a database, and parsing the SQL database query to identify one or more tables and columns identified by the SQL database query. The method also includes determining a query plan based on results from the parsed database query. At a database engine, and based on the query plan and the identified tables and columns, the method further includes identifying a set of data nodes implicated by the database, tables and columns, determining a set of map-reduce jobs and levels at which each of the set of map-reduce jobs are to execute, and passing the query plan, the set of data nodes, and the map-reduce jobs to a map-reduce query execution framework.

In a second aspect, a computer storage medium is disclosed. The computer storage medium includes computer-executable instructions which, when executed on a computing system, cause the computing system to perform a method of processing a data query. The method includes receiving a SQL database query at a database query handling server, and parsing the SQL database query to identify a database and one or more tables and columns identified by the SQL database query. The method also includes determining a query plan based on results from the parsed database query. At a database engine, and based on the query plan and the identified database, tables and columns, the method further includes identifying a set of data nodes implicated by the identified database, tables and columns, determining a set of map-reduce jobs and levels at which each of the set of map-reduce jobs are to execute, and passing the query plan, the set of data nodes, and the map-reduce jobs to a map-reduce query execution framework.

In a third aspect, a database query handling system is disclosed. The system includes a plurality of data nodes, and a database query handling server communicatively connected to each of the plurality of data nodes. The database query handling server includes a parser component, a query planner component, and a database engine. The parser component executes on a database query handling server, and is configured to parse a SQL database query to identify a database and one or more tables and columns identified by the SQL database query. The query planner component executes on the database query handling server, and receives the SQL database query, the database, and the one or more tables and columns. The query planner component is configured to determine a set of operations and an execution sequence of the set of operations used to perform the SQL database query. The database engine executes on the database query handling server. It is configured to, based on the query plan and the identified database, tables and columns, identify a set of data nodes implicated by the identified tables and columns from among the plurality of data nodes, and determine a set of map-reduce jobs and nodes at which the map-reduce jobs are to be executed.

DETAILED DESCRIPTION

Figure 1:
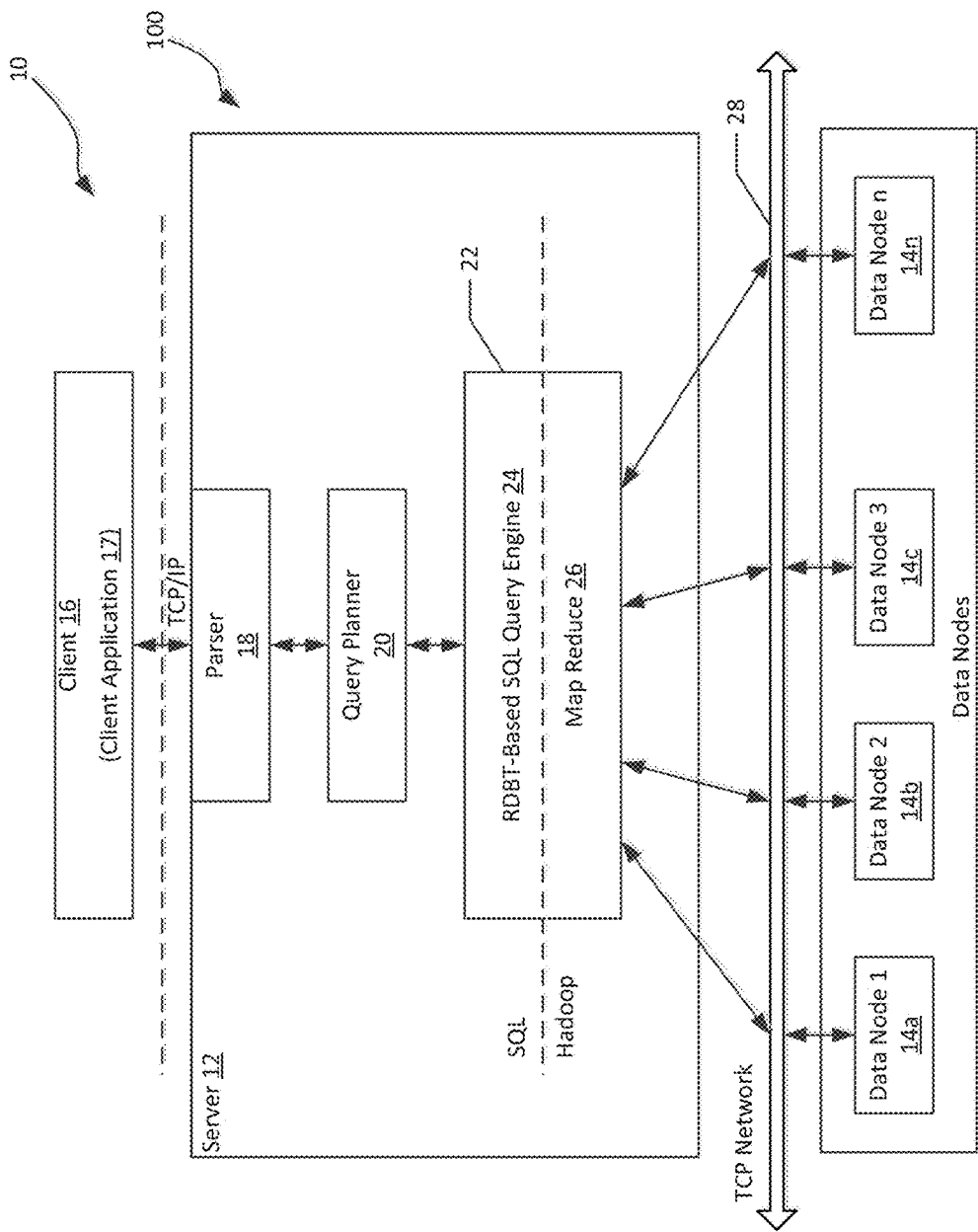
FIG. 1 is a schematic view of a database query handling system according to an example embodiment of the present disclosure.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In general the present disclosure relates to methods and systems for processing database queries, in particular database queries formatted in a SQL database query language (referred to herein as a "SQL database query"). The methods and systems described herein provide a construct for efficiently storing and managing large-scale data at low cost, using compact data structures and minimal management software to provide a data storage and access arrangement in which parallel data access across various portions of a distributed database are possible. Furthermore, in contrast to existing SQL databases, tables and indices can be split across data nodes, thereby avoiding the possibility of a lengthy table or a particularly overwhelmed data file or database management system from delaying return of query results.

Referring now to FIG. 1, a general overview of a database query handling system 100 is illustrated, according to an example embodiment. In the embodiment shown, an overall arrangement 10 including the database query handling system 100 is shown, where the system 100 includes a server 12 and a plurality of data nodes 14a-n (referred to herein individually and collectively as data nodes 14, unless a particular data node is referred to).

The server 12 can be provided on one or more computing systems, for example the computing system 600 of FIG. 6, below. The server generally is configured to be the computing system that is addressed by a client system 16 hosting a client application 17 when that client application intends to submit a SQL language query to a database. In the embodiment shown, the client application 17 is an application capable of generating SQL language queries and communicating those queries to the server 12, and is configured to receive query results in response. In the embodiment shown, the client application 17 is located at a client device 16 which is a remote computing device, connected to the server 12 via any of a variety of networks (e.g., LAN, WAN, or other public or private networks). In alternative embodiments, the client application 17 may be local to the server 12. In some embodiments, the server 12 can be implemented as a cloud-based application in which the client system and associated application 16 addresses the server component 12 by address, but the functionality supporting the SQL query processing is obscured from the application 17 or a user operating that application.

In the embodiment shown, the server 12 includes a parser component 18, a query planner component 20, and a query engine 22. Each of these systems is configured to assist the server in receiving, managing, and responding to SQL queries from the client application 17. Generally, the parser component 18 is configured to parse a SQL query received at the server 12. The parser component 18 extracts, for example, an identity of a database to which the SQL query is targeted, as well as relevant tables and columns within each table that will be used to fulfill a particular query. For example, the parser component can receive a SQL query, and, based on the database to which it is addressed, and the contents of the query (e.g., SELECT statements, parameters, etc.) the parser component 18 can recognize various components structurally within the query and identify them as tables, columns, or database names. The SQL query can then be passed to the query planner component 20, along with the tables, columns, and database name to which the SQL query is addressed. The query planner component 20 determines a set of operations that are to be performed using the various structures identified by the parser component and the order of such operations, for example based on the structure of the SQL query syntax. An example of the output of the parser component 18 and query planner component 20 are illustrated in further detail below in connection with FIG. 3.

The query engine 22 generally receives the query syntax and the names of the database, tables and columns, and generates a plan for executing a query based on the underlying data structure which it accesses. In the embodiment shown, the query engine 22 is constructed of two components, a database engine 24 and a map-reduce query execution framework 26. The database engine 24 appears, along with the parser component 18 and the query planner component 20, to represent a traditional database management system (DBMS) to application, such as client application 17. The database engine 24, however, is in fact an interface to an underlying data structure that is different from traditional SQL data structures. In particular, and as discussed in further detail below, the database engine 24 uses the query plan from the query planner component 20, as well as the extracted database identifier, tables and columns as determined by the parser component 18, to identify a set of the data nodes 14*a-n* that are implicated by the database, table, and column information, and to determine a set of reduce operations to be performed on data at those nodes. In various embodiments, the database engine 24 can manage a record in a tree structure that tracks the locations (e.g., IP addresses) of data nodes 14 containing particular data in a database, table and column. As further discussed below in connection with FIG. 2, data in a particular database table and column can be stored in a specific data block, which can be managed on a per-data node basis.

The set of reduce operations determined by the database engine 24 is largely based on the operations and order of operations determined by the query planner component 20. In example embodiments, the reduce operations correspond to an atomic set of operations that can be performed at the data block level, and which can be distributed to the various data nodes 14*a-n* storing data relevant to a particular query. For example, a SELECT or JOIN operation referencing two or more tables could involve atomic operations requesting data from a particular one or more data nodes, where a data request could be submitted to each node (i.e., a reduce operation on the data in each relevant block), as well as a subsequent atomic operation that combines the data obtained through the reduce operation. Depending upon the particular implementation, and as discussed in an example implementation below in connection with FIG. 4, the collected data could then be joined either at the server 12 or at a data node 14 that was among the parallel-executing data nodes. For example, and as discussed below, in some embodiments, a data node having a greatest amount of data could perform the join operation to minimize bandwidth required to transmit data across the various nodes 14*a-n*. In an alternative embodiment, Other embodiments are possible as well.

In the embodiment shown, the map-reduce query execution framework 26 distributes the atomic portions of the now-parsed, translated SQL query to one or more of the various data nodes 14*a-n* for parallel execution as directed by the database engine 24. In various embodiments, the map-reduce query execution framework 26 can be configured to segregate mapped jobs from the tasks in the query plan, and distribute the mapped jobs to the various data nodes 14*a-n*, for example by referencing IP addresses of data nodes having relevant data. The map-reduce query execution framework 26 will use the data from the one or more mapped jobs, for example as an input to a subsp-reduce operation. The map-reduce query execution framework 26, and nodes 14*a-n*, format and return the data that represents the query response to the client application 17.

In the embodiment shown, each of the data nodes 14*a-n* are communicatively connected to the server component 12, for example via a TCP/IP network 28. In alternative embodiments, other network arrangements could be used as well. Each data node 14*a-n* is generally arranged as a separate computing device known to and addressable by the server component 12, for example by IP address. In the embodiment shown, each data node 14*a-n* hosts one or more text files storing data associated with a particular subset of data normally managed within a SQL database.

Figure 2:
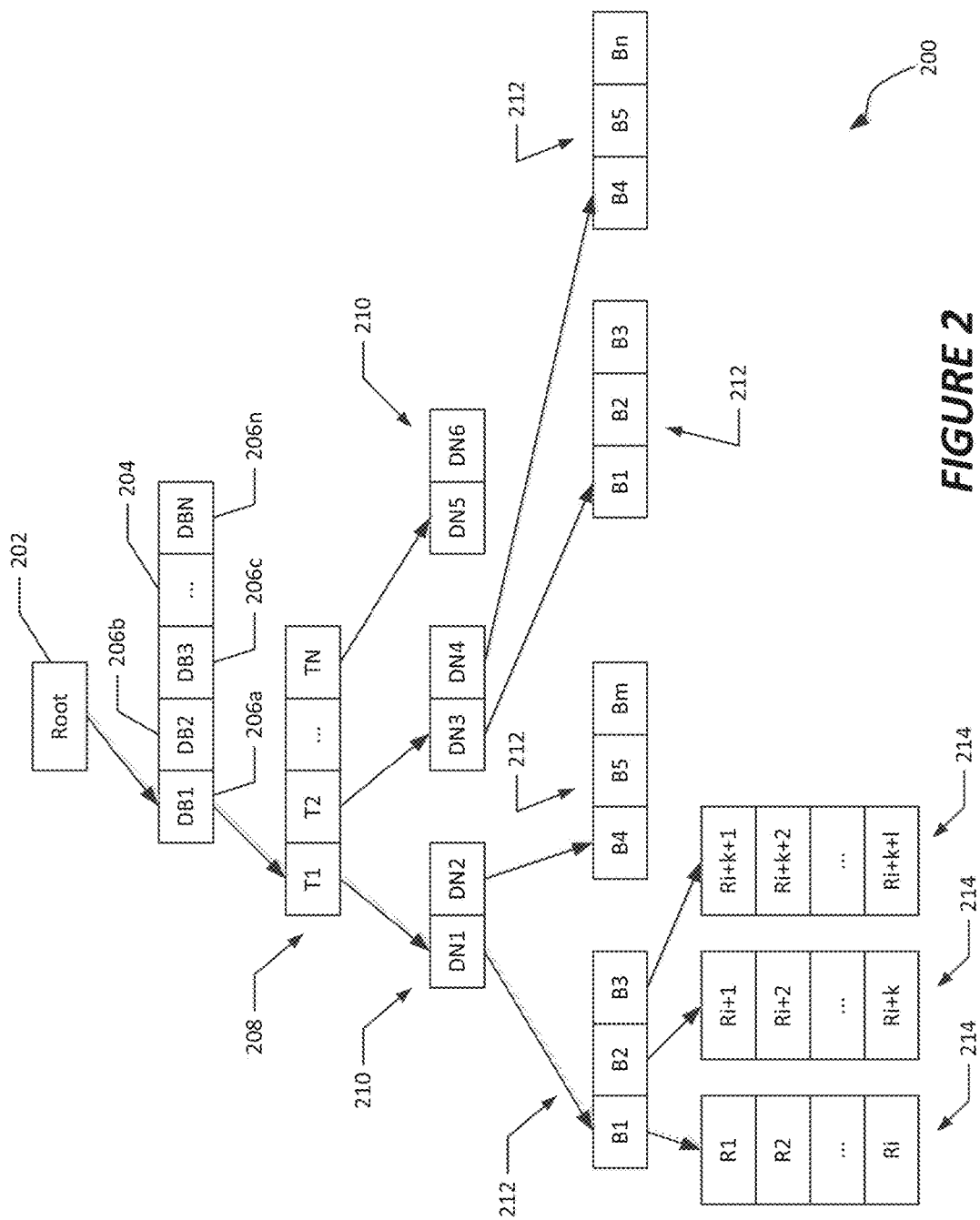
FIG. 2 is a logical view of a tree structure tracked by the database query handling system and in which data can be stored, according to an example embodiment of the present disclosure.

Referring now to FIG. 2, a logical view of a tree structure 200 that is tracked by the database query handling system and in which data can be stored, according to an example embodiment of the present disclosure. The tree structure 200 is maintained at the query engine 22, for use by the database engine 24 and map-reduce query execution framework 26, to plan and route mapped tasks to the various data nodes, based on expected data at each node. In the embodiment shown, the tree structure can be used by the system 100 to manage a plurality of databases. In particular the tree structure includes a root node 202 at which the query engine can start traversal to locate data nodes at which relevant data may be stored. Initially before adding the database, the root node 202 is empty and no children nodes are present. A structure 204 of databases 206*a-n* is linked to the root node 202. The query engine 22 can locate the correct database among the list, for example through using the extracted database identifier obtained by the parser component 18. Each database 206*a-n* is linked to a structure 208 that includes a list of tables associated with that database. Each database will have one database node entry in the tree, and will point to one minimum child node called a table node. Although in the example shown "n" tables are affiliated with each database, it is understood that any number of tables could be associated with the database, depending on the desired number of logical segments of data are desirable.

Each table listed in the structure 208 is in turn linked to a list of data nodes 210. The list of data nodes 210 corresponds to a listing of addressable, separate computing systems that contain data affiliated with a particular table of a particular database. In other words, data for a specific table of a database can be stored across a variety of computing systems, thereby avoiding some of the disadvantages discussed above, such as the over-population of a particular file due to a large table. The table node (i.e., nodes 210) has the entries for each table name of the database. Each table node points to the set of nodes in the layer below on which the table is distributed and stored. It contains the IP addresses or the names of the computers. Each node connects to the system that store the blocks corresponding to the table.

In the embodiment shown, each data node in a list of data nodes 210 can store data associated with one or more blocks in a list of data blocks 212. Data nodes are the machines that store the data in the form of blocks. Each table points to set of data nodes on which it is stored. The data node information can be, in some embodiments, designated as a task to be performed by the map-reduce query execution framework 26. In some embodiments, each block corresponds to a particular file hosted at a data node, and which can be accessed from the server 12. In various embodiments, data stored in each file can vary. In example embodiments, the data in a data file is stored such that each data node stores a block of data of a predetermined maximum size. Each table is stored in a text file which is split into one or more blocks. Within that text file that is stored in terms of a number of blocks (and as illustrated within a list of data records 214 associated with each block in the list of data blocks 212), each record is stored as a separate line, and each column is tab-separated within the record.

In some embodiments, each table can be spread across multiple nodes (such as illustrated in the list of data nodes 210 associated with a particular table); however, in some alternative embodiments, all of the tables can be stored into the same list of data nodes 210, for example by placing one block from each table in each node, or some similar arrangement. In some embodiments, table size and block size determine the number of data nodes to be used to store the table. In such embodiments, various factors can be applied to determine the number of nodes to be used; in one example, at least one block per data node needs to be stored. Accordingly, for a given table size, the block size and number of data nodes is selected such that one block is stored at each data node, and such that data nodes are not over- or under-loaded. Other embodiments are possible as well.

In addition, the various data nodes 210 are configured to store data associated with one or more tables, with each data block for a table stored in a different data node. In some embodiments, each of the data nodes 210 is dedicated to a separate table, to the extent possible. This allows for efficient use of each of the data nodes for evaluating a query, since the same data node need not support different queries or portions of a query at once. In alternative embodiments, each table can be spread across all of the data nodes. In this arrangement, it is possible to avoid overloading only a few of the data nodes with blocks of a large table, such that data queries are distributed more evenly across the data nodes.

It is noted that, in the embodiments of the present disclosure discussed herein, each of the data nodes stores a text file that can be parsed using a native operating system or native executable code simply. As such, each of the data nodes (e.g., nodes 14) are not required to include separate database management systems loaded and executing thereon, resulting in a low cost arrangement. Other arrangements are possible as well.

Figure 3:
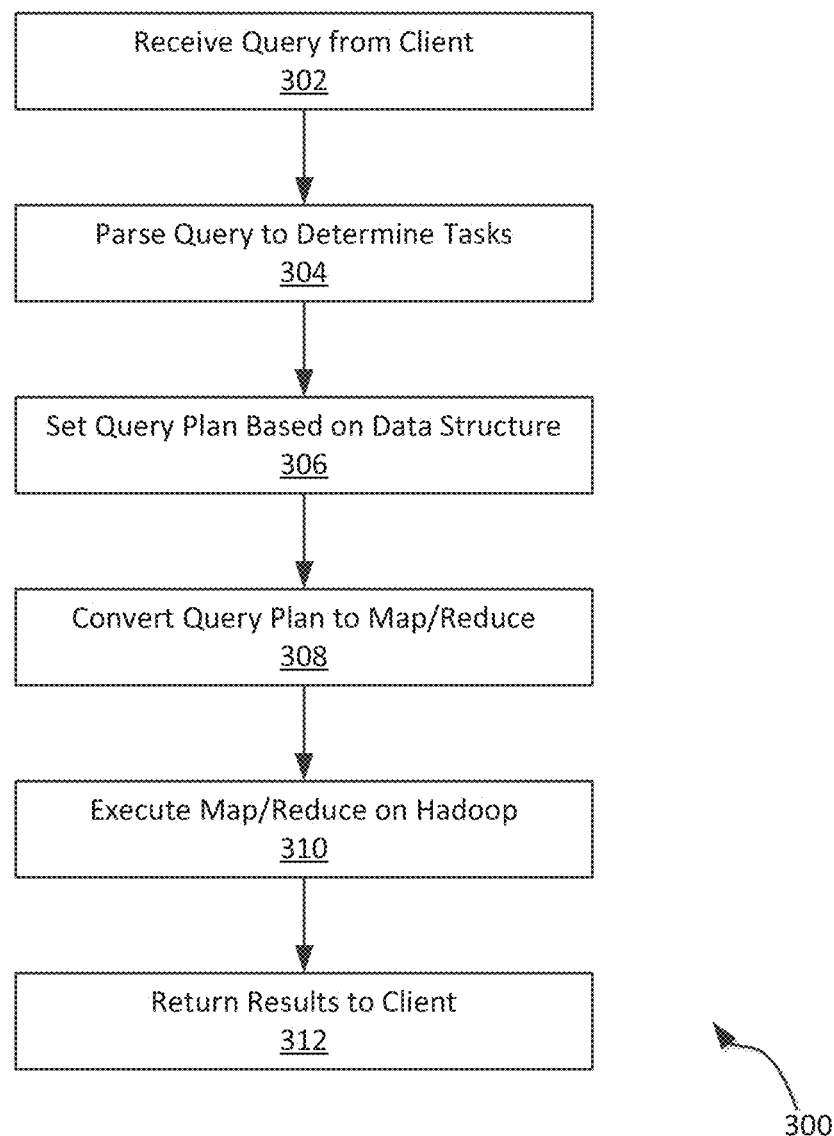
FIG. 3 is a flowchart of a method for handling SQL queries, according to an example embodiment of the present disclosure.

Referring now to FIG. 3, a flowchart of a method 300 is illustrated for handling SQL queries, according to an example embodiment of the present disclosure. The method 300 is generally configurable to execute one or more queries using the system 100 disclosed above. In the embodiment shown, the method 300 can include receiving a SQL query from a client application (step 302). The query can take any of a variety of forms, and generally is configured to be any of a variety of types of SQL queries.

The method also includes parsing the received SQL query (step 304) to determine an identity of a database, as well as one or more tables and columns associated with a particular query. Parsing the received SQL query can include, for example, using a parsing component 18 of a server 12. The method also includes determining a query plan based on the parsed SQL query (step 306). At a database engine, and based on both the parsed SQL query and the query plan, the query plan is converted to a map-reduce execution plan (step 308). This can include, for example, identifying a set of data nodes implicated by the SQL query, for example based on inspection of a tree structure defining data locations associated with the database, and determining a set of reduce operations and levels at which those reduce operations are to be executed. The data node identified can then be used to pass mapped jobs and reduce operations to the associated data nodes, to be executed (step 310), and for data to be returned to the server for return to a client (step 312).

In some embodiments, the method 300 can be performed using multiple map-reduce jobs, such that the map-reduce execution plan developed in step 308 is developed differently based on the particular SQL query to be performed and structure of the overall system 100 in which it is executed. For example, query evaluation can be performed in multiple map-reduce jobs based on query type. In one example, the query evaluation is performed in map jobs, by selecting records based on evaluation of a condition. In a second example, query evaluation can be performed using one or more reduce operations, for example to generate the output file or files used to fulfill the query. Additionally, query evaluation can be performed by using an output generated in a previous map-reduce operation as an input to a next map-reduce operation to complete query evaluation, for example in the data nodes.

In an example of operation of such a system using multiple map-reduce jobs, a JOIN query is considered. For example, the following SQL query could be received by the server 12 of FIG. 1:

SELECT * FROM t1, t2 WHERE t1.c1=t2.c1

In this case, the query plan would be to select the smaller table from table t1 and table t2. The specific column from the table identified as the smaller table is obtained using a first map operation, and is placed in an output file with a single reduce operation. The column values in this output file are then used as keys for a second map operation in the larger table of t1 and t2. This map operation results in obtaining matching records from the larger table for all of the keyed column values from the smaller table, and the associated reduce operation results in preparation of an output file that contains the overall results, using a single (or multiple, in case of additional tables or more complex expressions) reduce operation.

Table 1 below illustrates a set of four example SQL queries converted to map-reduce tasks, using the parser component 18, query plan component 20, and query engine 22 to execute the method 300, as explained above:

TABLE 1

| | | | | Conversion of SQL Query to Map-Reduce | | |
|---|---|---|---|---|---|---|
| | <-Parser-> | <- | Query Planner | -> <- | Engine | -> <- MR -> |
| # | SQL Query | Tasks | Data Node IPs | Map-Tasks | Reduce-Tasks | |
| 1 | SELECT * FROM 't1' | Read (*, t1) | DN1, DN2 | Read (*, t1) | Collect(DataNode1, DataNode2) | |
| 2 | SELECT * FROM t1 WHERE c1 = 'x' | Read (*, t1) for c1 = x | DN1, DN2 | Read ([c1, x], t1) | Collect(DataNode1, DataNode2) | |
| 3 | SELECT 'c1', 'c2' FROM 't1' | Read (c1, t1) Read (c2, t1) | DN1, DN2 | Read ([c1, c2], t1) | Collect'c1' and'c2' (DataNode1, DataNode2) | |
| 4 | SELECT * FROM t1, t2 WHERE t1.c1 = t2.c1 | Read (c1, t1) Read (*, t2) such that for all t1.c1 t1.c1 = t2.c1 | DN1, DN2, DN3, DN4 | Map-1 Read (c1, t1) Map-2 Read (*, t2) such that for all t1.c1 t1.c1 = t2.c1 | Reduce-1 Collect 'c1' (DataNode1, DataNode2) Reduce-2 Collect(DataNode3, DataNode4) | |

As can be seen in the above table, each of the SQL queries can be broken down into a series of read tasks at particular data nodes by a parser and query planner. The query engine can generate one or more map tasks and reduce tasks associated with that SQL query, for execution at particular data nodes associated with the query. For example, in the case of the SELECT * FROM 't1' query, the system 100 would determine that all records in table 't1' are to be read, and that, based on the tree structure, table t1 is stored in data nodes DN1 and DN2. As such, a Read( ) map task is distributed to each of the data nodes DN1, DN2, and a reduce task is used to compile the appropriate set of results; in this case, a combination of reads of all records from DN1 and DN2. Analogous sequences of operations are performed for each of the other example SQL queries of Table 1.

It is noted that, based on the example discussed above, the reduce task used to collect records from the data nodes can be performed at any of the data nodes associated with that task. It is further noted that the reduce task is performed following completion of all of the map tasks, such that the reduce tasks represents one or more operations performed to narrow a data set to a desired set of records from an overall set of records received from particular tables. Generally, it is noted that various types of reduce tasks, or jobs, can be defined using the framework 26. In one example, a reduce task may be to simply collect records selected via map operations. In this case, the number of output files created is equal to the total number of reduce operations defined by the framework. In a further example, a reduce operation in fact evaluates the query based on the local data at the node performing the reduce operation.

Figure 4:
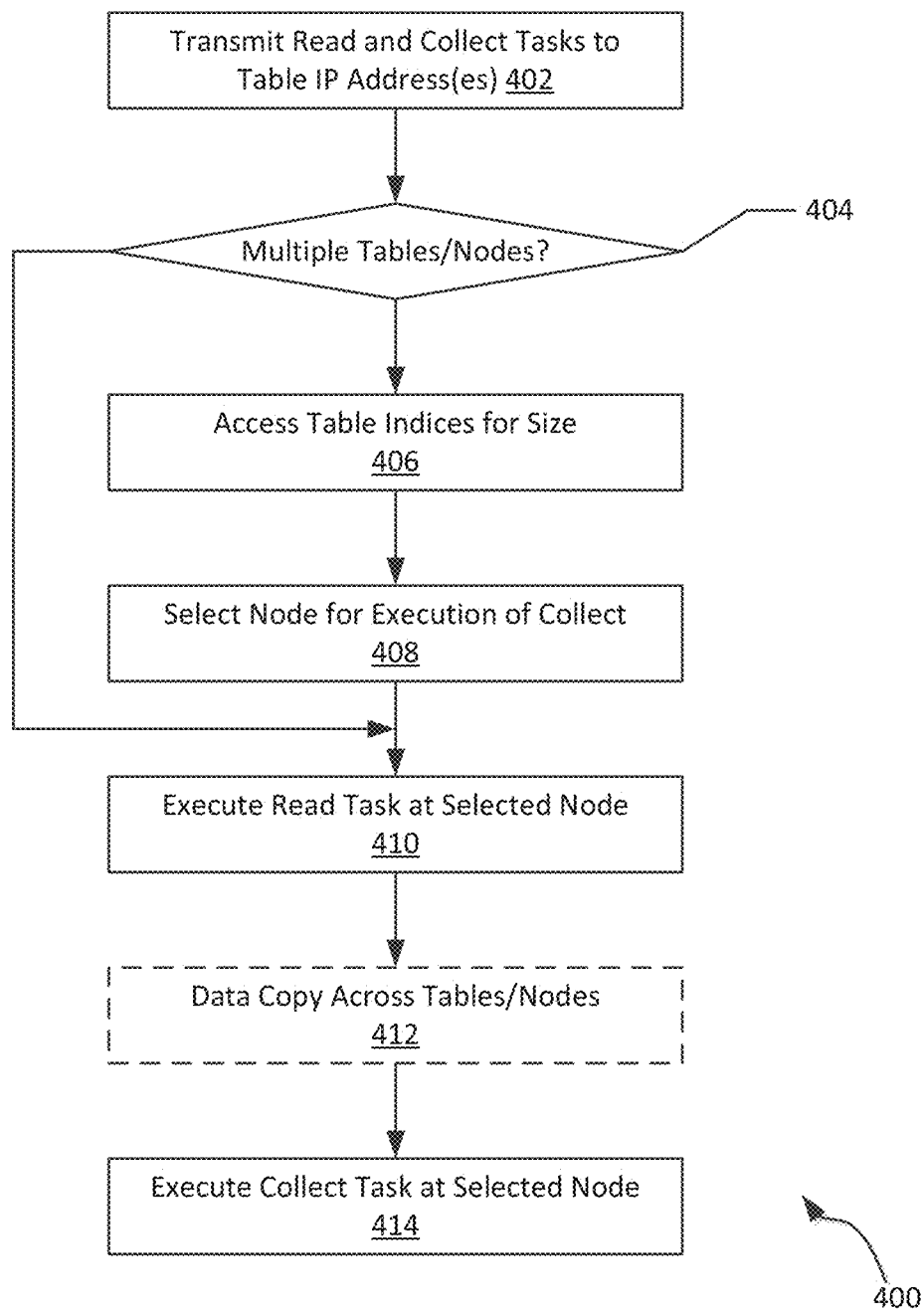
FIG. 4 is a flowchart of a map-reduce process performed in the database query handling system of the present disclosure, for example as directed by a database engine, according to an example embodiment of the present disclosure.

In accordance with FIG. 4, an example flowchart of aspects of a map-reduce process 400 are illustrated, performed in the database query handling system of the present disclosure. The process 400 can be executed, for example, at the server 12 to identify a particular node at which to perform a reduce task on the collected mapped job data.

In alternative embodiments, and in particular where a query implicates multiple nodes (e.g., due to a table being spread across more than one node, or where more than one table is referenced in the query), more than one data node may perform a reduce task. In such cases, multiple reduce operations can be performed, with the number of output files corresponding to the number of reduce operations to be performed. In a particular embodiment, the number of reduce operations to be performed corresponds to the number of data nodes to which the map-reduce operations are distributed, such that each node returns results responsive to the query for that node. In such cases, and as explained above in connection with the JOIN operation discussed in connection with FIGS. 1 and 3, above, those output records could be used as input keys in another table to arrive at a set of results without requiring copying/aggregation of results themselves.

In the embodiment shown, the process 400 includes transmitting the map and reduce tasks to one or more data nodes 14 as identified by the database engine 24 (step 402). An assessment operation 404 determines whether multiple tables and/or data nodes are involved in a particular SQL query, and can be determined based on the output of the parser component 18 for number of tables or database engine 24 (based on inspection of a tree structure 200) to determine a number of data nodes. If more than one table or data node is involved in a particular query, each of the table indices implicated by the query are accessed to determine the size of those tables (step 406). Based on the size of the tables, a particular data node is selected for performing the reduce task(s) (step 408). The selection of the data node can be based on a number of considerations, but in some embodiments involves use of a data node associated with the largest set of records to reduce bandwidth and latency involved in transmitting the largest data set from a particular data node to another node to perform a reduce operation.

Once the data node executing the reduce task(s) is identified, read tasks are performed, resulting in access of data at one or more data nodes implicated by the SQL query (step 410). If, as discussed above, data from multiple data nodes or tables are associated with a particular SQL query, the data is transmitted to the selected data node identified in step 408 (step 412). A data collection task, used to select and aggregate data received from the various responsive data nodes, is performed at the identified data node, for return to the client 16 (step 414).

Referring overall to FIG. 4, it is recognized that a variety of other design arrangements could be implemented in the alternative to the arrangement discussed herein where a particular data node performs the data collection tasks from each of a set of other data nodes. For example, many reduce operations can be set, such that results are collected in multiple output files and consolidated by a final reduce operation. In such an arrangement, data collection could be performed directly at the client application 17. Still other arrangements, or algorithms for selecting the particular data node or nodes to perform data collection, are possible as well.

Figure 5:
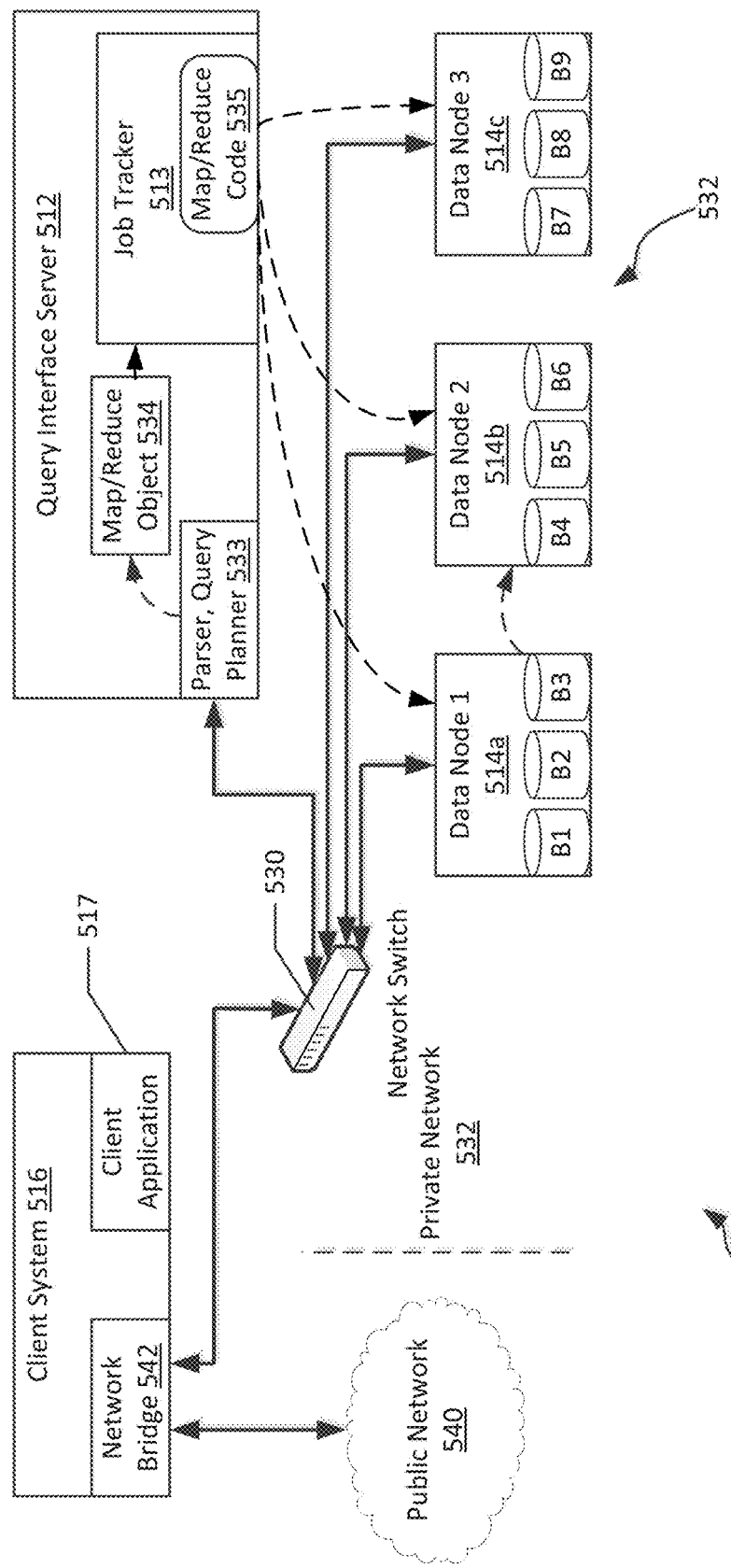
FIG. 5 is a schematic diagram of an alternative example database query handling system, arranged according to the methods and systems discussed herein and illustrated in FIGS. 1-4.

Referring now to FIG. 5, a schematic diagram of an alternative example database query handling system 500 is illustrated, arranged according to the methods and systems discussed herein and illustrated in FIGS. 1-4. The database query handling system 500 represents a particular implementation of the system 100 in which a remote client application 517 at a client system 516 is used to transmit SQL queries to a server 512, each of which correspond generally to the application 17, client system 16, and server 12 described above in connection with FIGS. 1-4. In the embodiment shown, the client system 516 is communicatively connected to the server 512 via a network switch 530, which provides an interface between a remote client system and a local intranet 532 in which the server 512 resides. As illustrated in FIG. 5, the client system 516 is communicatively coupled to a public network 540, such as the internet. A network bridge 542 at the client system 516 allows connection to either the local intranet 532 or public network 540.

In the embodiment shown, the server 512 includes a parser and query planning component 533, which receives queries from the client system 516 analogously to the manner described in connection with components 18-24 of FIG. 1. A map-reduce object 534, representing operations to be performed by the map-reduce framework, as discussed above in connection with FIGS. 1-4. The server 512 also includes a job tracker component 513 that includes, among other elements, map-reduce jar file 535, which it distributes to the data nodes 514*a-c* (shown by dotted lines). The map-reduce jar file 535 may be made available in the Apache Hadoop data access framework, for use in implementing the map-reduce database engine 26 of FIG. 1. The output of the query is provided to the client application 517.

In the embodiment shown, a plurality of data nodes 514, shown as data nodes 514*a-c*, are included within the local intranet 532, and are accessible by the server 512. The data nodes 514*a-c* each include a plurality of data files storing data accessible via the server 512; in this embodiment, to test transfer of mapped data across data nodes as discussed above in connection with FIG. 4, data tables are spread across two different data nodes, such that a SELECT operation on each of the records of a table would require a parallel read operation at different data nodes, as well as collection of data at one of the nodes, for example according to the table indices, as previously explained.

Using the system 500 of FIG. 5, a variety of queries were performed, comparing the system 500 to a standard, distributed SQL database in which a table is located in a single file, and processed natively using the SQL query language. Results of such tests are illustrated in the bar graph 600 of FIG. 6. As seen in that graph, at low numbers of records, the SQL query remains efficient, and avoids the translation overhead involved in the translation of a SQL query to map-reduce tasks and distribution of such tasks to multiple remote data nodes. However, for larger data sets (e.g., 1M or 100M records), the efficiency of native SQL query execution is obscured by latency that is incurred in obtaining specific data records from large tables within a SQL database. By contrast, the methods and systems described herein, implementing the database query handling system 500, have some performance penalty, but it is comparatively lower than the performance penalty associated with native SQL execution.

Figure 6:
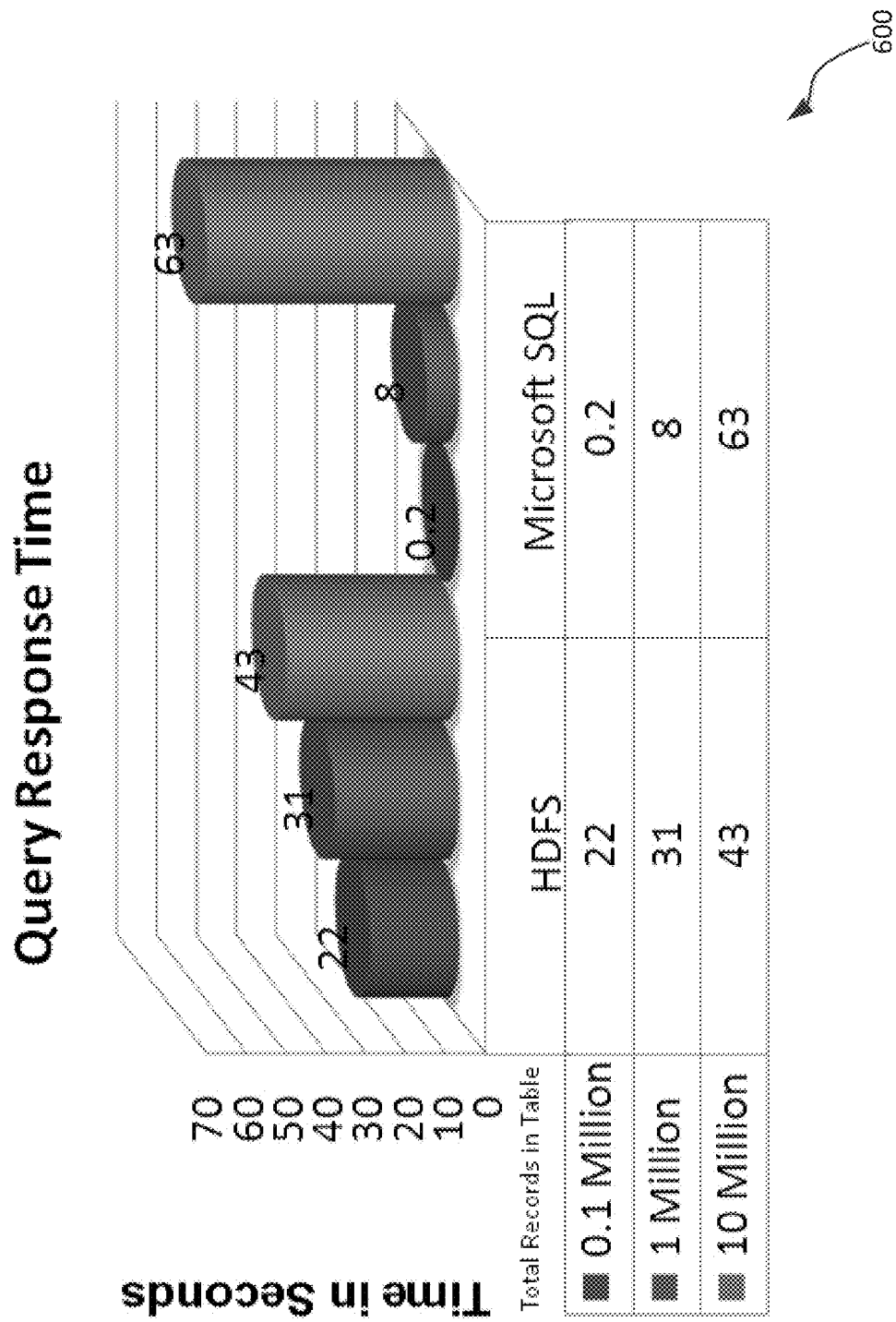
FIG. 6 is a set of bar charts illustrating examples observed execution times using the system of FIG. 5.
Figure 7:
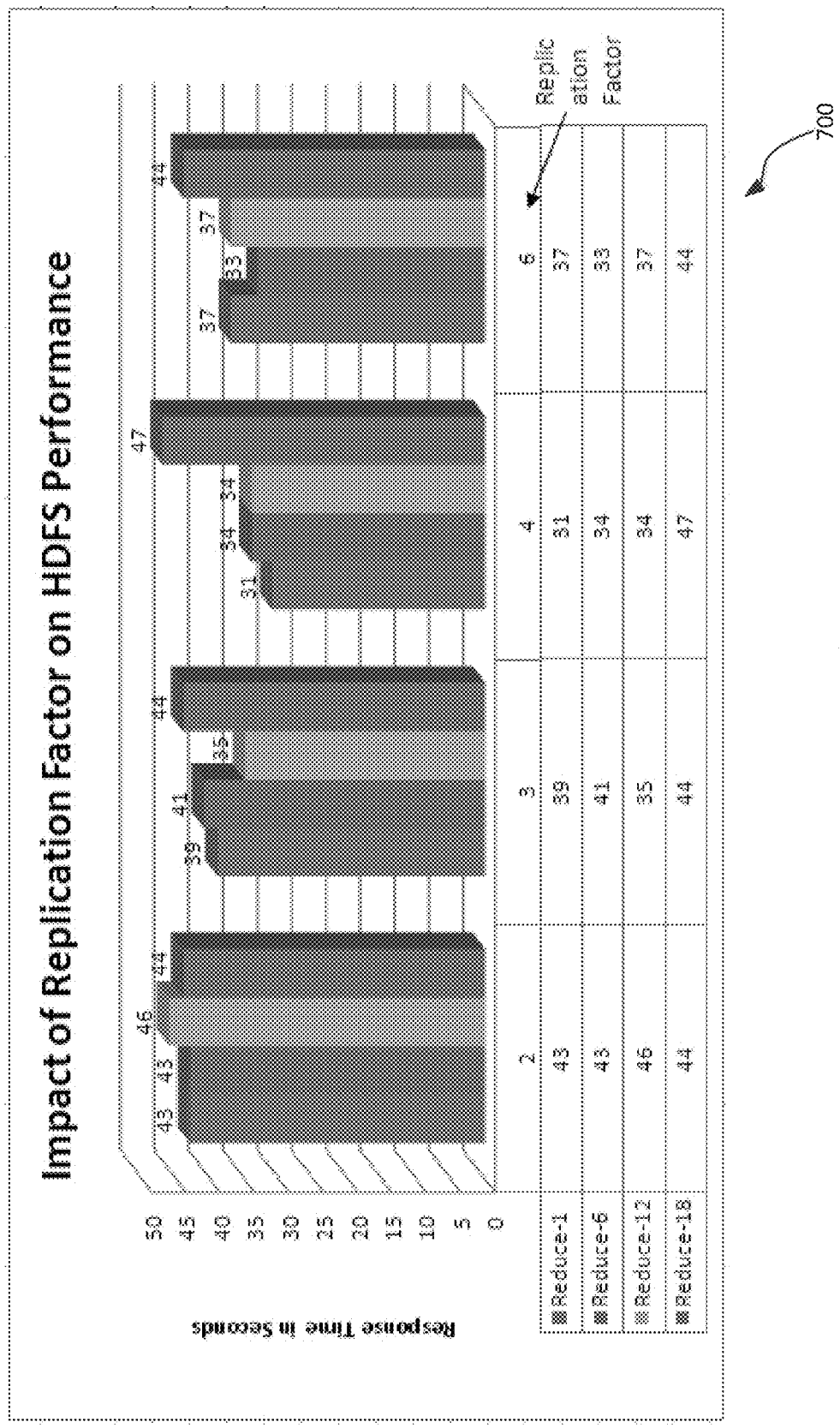
FIG. 7 is a set of bar charts illustrating example observed effects of having multiple copies of tables across data nodes, using the system of FIG. 5.
Figure 8:
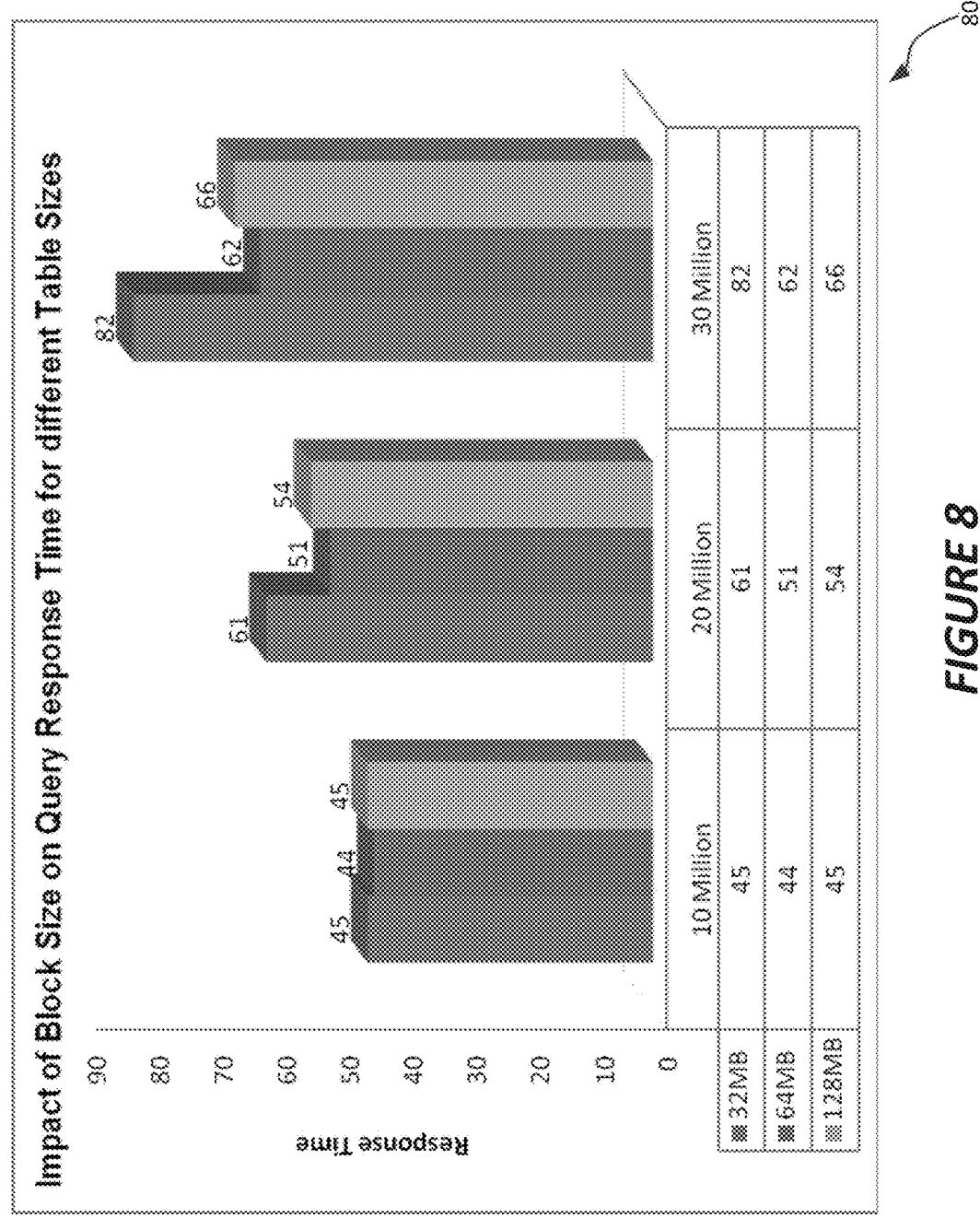
FIG. 8 is a set or bar charts illustrating example observed impact of block size on the query response time for tables of varying sizes, using the system of FIG. 5.
Figure 9:
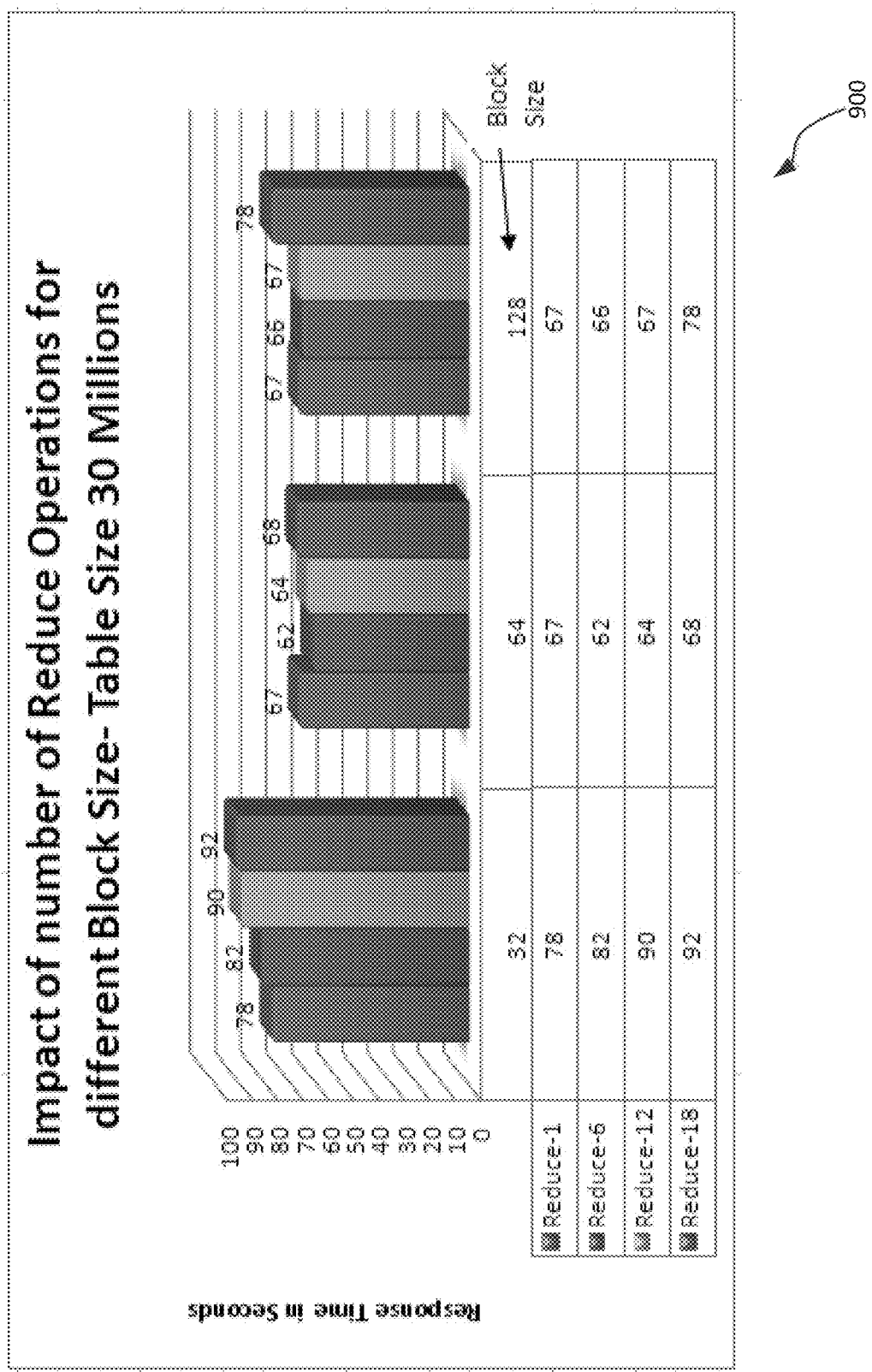
FIG. 9 is a set of bar charts illustrating example observed effects of the number of reduce operations used to satisfy a query.

In addition to the bar graph 600 of FIG. 6, it is noted that the various possible configurations of the systems described herein may also have an effect on performance. In particular differences in the replication factor of data across nodes, as well as block size of data blocks at each node and number of reduce operations performed for each query, can affect performance. FIGS. 7-9 illustrate observed results of varying these parameters.

In the example shown, FIG. 7 depicts a chart 700 that includes bar graphs illustrating example observed effects of replication of a table across multiple blocks and data nodes, using the system of FIG. 5. A replication factor determines the number of copies made for each block. A higher replication factor corresponds to more copies of data of each block, spread across the data nodes, thereby making each block more readily available on more data nodes, for efficient workload distribution.

As seen in that chart 700, in genera as the replication factor increases, during map operations a given data node can access different blocks without sitting idle, waiting for a query that implicates a particular table or block. In the chart 700, the best observed case is to set the replication factor such that each block of a given table is available on all data nodes on which the table needs to be stored (i.e., the entire table is stored at each data node). Otherwise the average case is to set the replication factor to 2 or 3.

In FIG. 8, a chart 800 is illustrated that presents an observed impact of block size on the query response time for tables of varying sizes, using the system of FIG. 5. As illustrated, the predetermined size of each block has an impact on the response time and hence on the overall performance. As can be seen in the char 800, generally, smaller block sizes result in the relative overhead of the map-reduce framework to increase, while larger block sizes hold execution threads for a longer amount of time, and decrease the likelihood of enabling overlapping jobs at that data node, or relating to that particular data block. As such, it can be seen that, for larger table sizes, a small block size becomes disadvantageous. From these considerations, it is suggested that, for a given table, the block size is selected such that the data nodes are neither overloaded nor under loaded, but rather have approximately constant-sized blocks proportional to the table size.

FIG. 9 is a chart 900 including a set of bar graphs illustrating example observed effects of the number of reduce operations used to satisfy a query. In the chart 900 as shown, it can be seen that the total number of reduce operations performed can affect performance. In general, the best practice to choose a number for reduce operation is based on the query type, which is reflected in the tables involved, and the number of data nodes on which the table is stored (defined by the tree structure 200 of FIG. 2). In some embodiments, the query planner determines how many reduce operations required for the given query dynamically, thereby optimizing this aspect of the system to selectively require either a multi-step map-reduce process (i.e., in which output of a first map-reduce operation are used as keys to a second or subsequent map-reduce operation), or a single process in which results are aggregated or simply returned.

Referring now to FIGS. 1-9 generally, it is recognized that the methods and systems described herein have a number of operational advantages over native SQL query execution, in particular for large data sets. For example database tables are distributed across multiple data nodes, allowing parallel processing of queries. Further, in some embodiments, the number of data nodes required can be calculated based on the total blocks a largest table would create for a predetermined block size, and the number of blocks required to be stored on each data node. On some cases, data nodes can be configured such that one data node stores one block and its index, the minimum number of data nodes that is required is equal to the number of blocks used by a largest table (since data nodes can be reused by different tables). In other embodiments, data nodes can be configured based on a number of blocks to be stored at each node. Additionally, due to the management of a tree structure at a server that handles query receipt and processing, processing and computation of data can be performed "near" that data, and allow for careful minimization of bandwidth usage when transmitting data through a network. Traditional SQL data processing does not consider network bandwidth issues when considering how best to process a query. Other advantages are apparent from the present disclosure as well.

Figure 10:
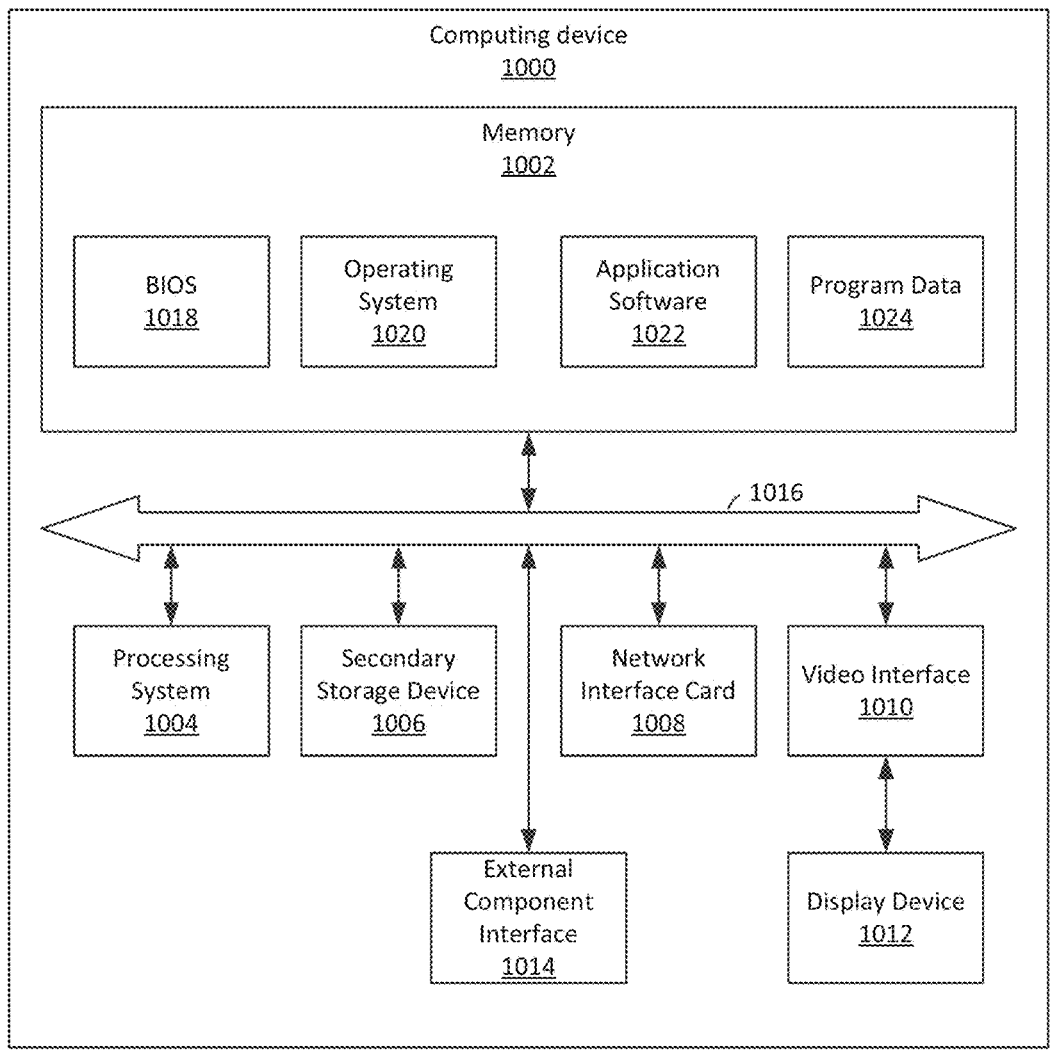
FIG. 10 is a block diagram of an electronic computing device in which aspects of the present disclosure can be implemented.

Referring now to FIG. 10, a block diagram illustrating an example computing device 1000 is shown, which can be used to implement aspects of the present disclosure. In particular, the computing device 1000 can represent a server, such as server 12 or data node 14 of FIG. 1 or any of the computing systems described herein, and can be used to execute any of the methods or implement any of the systems discussed herein as well.

In the example of FIG. 10, the computing device 1000 includes a memory 1002, a processing system 1004, a secondary storage device 1006, a network interface card 1008, a video interface 1010, a display unit 1012, an external component interface 1014, and a communication medium 1016. The memory 1002 includes one or more computer storage media capable of storing data and/or instructions. In different embodiments, the memory 1002 is implemented in different ways. For example, the memory 1002 can be implemented using various types of computer storage media.

The processing system 1004 includes one or more processing units. A processing unit is a physical device or article of manufacture comprising one or more integrated circuits that selectively execute software instructions. In various embodiments, the processing system 1004 is implemented in various ways. For example, the processing system 1004 can be implemented as one or more processing cores. In another example, the processing system 1004 can include one or more separate microprocessors. In yet another example embodiment, the processing system 1004 can include an application-specific integrated circuit (ASIC) that provides specific functionality. In yet another example, the processing system 1004 provides specific functionality by using an ASIC and by executing computer-executable instructions.

The secondary storage device 1006 includes one or more computer storage media. The secondary storage device 1006 stores data and software instructions not directly accessible by the processing system 1004. In other words, the processing system 1004 performs an I/O operation to retrieve data and/or software instructions from the secondary storage device 1006. In various embodiments, the secondary storage device 1006 includes various types of computer storage media. For example, the secondary storage device 1006 can include one or more magnetic disks, magnetic tape drives, optical discs, solid state memory devices, and/or other types of computer storage media.

The network interface card 1008 enables the computing device 1000 to send data to and receive data from a communication network. In different embodiments, the network interface card 1008 is implemented in different ways. For example, the network interface card 1008 can be implemented as an Ethernet interface, a token-ring network interface, a fiber optic network interface, a wireless network interface (e.g., Wi-Fi, WiMax, etc.), or another type of network interface.

The video interface 1010 enables the computing device 1000 to output video information to the display unit 1012. The display unit 1012 can be various types of devices for displaying video information, such as a cathode-ray tube display, an LCD display panel, a plasma screen display panel, a touch-sensitive display panel, an LED screen, or a projector. The video interface 1010 can communicate with the display unit 1012 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 1014 enables the computing device 1000 to communicate with external devices. For example, the external component interface 1014 can be a USB interface, a FireWire interface, a serial port interface, a parallel port interface, a PS/2 interface, and/or another type of interface that enables the computing device 1000 to communicate with external devices. In various embodiments, the external component interface 1014 enables the computing device 1000 to communicate with various external components, such as external storage devices, input devices, speakers, modems, media player docks, other computing devices, scanners, digital cameras, and fingerprint readers.

The communications medium 1016 facilitates communication among the hardware components of the computing device 1000. In the example of FIG. 10, the communications medium 1016 facilitates communication among the memory 1002, the processing system 1004, the secondary storage device 1006, the network interface card 1008, the video interface 1010, and the external component interface 1014. The communications medium 1016 can be implemented in various ways. For example, the communications medium 1016 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 1002 stores various types of data and/or software instructions. For instance, in the example of FIG. 10, the memory 1002 stores a Basic Input/Output System (BIOS) 1018 and an operating system 1020. The BIOS 1018 includes a set of computer-executable instructions that, when executed by the processing system 1004, cause the computing device 1000 to boot up. The operating system 1020 includes a set of computer-executable instructions that, when executed by the processing system 1004, cause the computing device 1000 to provide an operating system that coordinates the activities and sharing of resources of the computing device 1000. Furthermore, the memory 1002 stores application software 1022. The application software 1022 includes computer-executable instructions, that when executed by the processing system 1004, cause the computing device 1000 to provide one or more applications. The memory 1002 also stores program data 1024. The program data 1024 is data used by programs that execute on the computing device 1000.

Although particular features are discussed herein as included within an electronic computing device 1000, it is recognized that in certain embodiments not all such components or features may be included within a computing device executing according to the methods and systems of the present disclosure. Furthermore, different types of hardware and/or software systems could be incorporated into such an electronic computing device.

In accordance with the present disclosure, the term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, DDR4 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Computer storage media generally excludes transitory wired or wireless signals. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as Wi-Fi, acoustic, radio frequency (RF), infrared, and other wireless media.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A method of processing a database query, the method comprising:
   receiving a SQL database query at a database query handling server managing access to a database;
   parsing, by the database query handling server, the SQL database query to identify one or more tables and columns identified by the SQL database query;
   determining, by the database query handling server, a query plan based on the parsed database query; and
   at a database engine running on the database query handling server, based on the query plan, and the identified tables and columns:
      identifying, by the database query handling server, a set of data nodes implicated by the database and the identified one or more tables and columns,
      determining, by the database query handling server, based on the identifying, a set of map-reduce operations and levels at which each of the set of map-reduce operations are to execute; and
      passing, by the database query handling server, the query plan, the set of data nodes, and the map-reduce operations to a map-reduce query execution framework running on the database query handling server,
      wherein the set of map-reduce operations correspond to an atomic set of operations that are performed at a data block level,
      wherein the map-reduce query execution framework is configured to distribute each of the map-reduced operations of the parsed query to one or more data nodes communicatively connected to the database query handling server by referencing IP addresses of the one or more data nodes having relevant data, and to receive data from the one or more data nodes in response to at least one of the map-reduced operations,
      wherein during map-reduced operations each data node of the one or more data nodes access different blocks of the data without sitting idle permitting each of the one or more data nodes to execute at a same time,
      wherein the database engine and the map-reduce query execution framework are part of one component running on the database query handling server; and
   wherein the one or more data nodes comprise a plurality of data nodes having a plurality of tables and indices distributed thereamong.

2. The method of claim 1, wherein identifying the set of data nodes includes determining, based on the database and the identified tables and columns, one or more data nodes containing data responsive to the SQL database query.

3. The method of claim 2, further comprising maintaining at the database engine a tree model for the database, the tree model associating one or more data nodes with each block of data stored in the database, one or more blocks of data with each table included in the database, and one or more tables with the database.

4. The method of claim 1, wherein the query plan comprises a set of operations and an execution sequence of the set of operations used to perform the SQL database query.

5. The method of claim 1, further comprising, at the map-reduce query execution framework, executing one or more of the set of map-reduce operations on the data received from the one or more data nodes.

6. The method of claim 1, further comprising, at the map-reduce query execution framework, distributing one or more of the set of map-reduce operations to a data node for execution prior to receiving the data from that data node.

7. The method of claim 6, wherein, upon determining that the one or more reduce operations is to be performed on responsive data from a plurality of data nodes, transferring the responsive data to the data node prior to performing a final reduce operation.

8. The method of claim 7, wherein the database engine designates the data node on which the final reduce operation is to take place.

9. The method of claim 1, wherein the one or more data nodes includes a first data node assigned a first map-reduce operation and a second data node assigned a second map-reduce operation, and wherein the first and second map-reduce operations are executed in parallel.

10. The method of claim 1, further comprising opening the database prior to passing the query plan, the set of data nodes, and the map-reduce operations to a map-reduce query execution framework.

11. The method of claim 1, further comprising: at the map-reduce query execution framework: distributing each of the map-reduce operations to a plurality of data nodes communicatively connected to the database query handling server; performing a first map-reduce operation at a first data node of the plurality of data nodes, thereby receiving a first result set including one or more records; and performing a second map-reduce operation at a second data node, wherein the one or more records are applied as keys at the second data node, and wherein the second map-reduce operation is directed by the keys.

12. The method of claim 11, further comprising receiving data from the second data node representing an intersection of records responsive to the query at the first and second data nodes.

13. A computer storage medium comprising computer-executable instructions which, when executed on a computing system, cause the computing system to perform a method of processing a data query, the method comprising:
   receiving, by a server, a SQL database query;
   parsing, by the server, the SQL database query to identify a database and one or more tables and columns identified by the SQL database query;
   determining by the server, a query plan based on the parsed database query; and
   based on the query plan and the identified database, tables and columns:
      identifying, by the server, a set of data nodes implicated by the identified database, tables and columns;
      determining, by the server, based on the identifying, a set of map-reduce operations and levels at which each of the set of map-reduce operations are to execute; and
      passing, by the server, the query plan, the set of data nodes, and the map-reduce operations to a map-reduce query execution framework running on the server,
   wherein the set of map-reduce operations correspond to a set of atomic set operations that are performed at a data block level,
      wherein map-reduced query execution framework is configured to distribute each of the map-reduced operations of the parsed query to one or more data nodes communicatively connected to the server by referencing IP addresses of the one or more data nodes having relevant data, and to receive data from the one or more data nodes in response to at least one of the map-reduce operations,
      wherein during map-reduced operations each data node of the one or more data nodes access different blocks of the data without sitting idle permitting each of the one or more data nodes to execute at a same time,
wherein the identifying, the determining the set of map-reduce operations and levels at which each of the set of map-reduce operations are to execute, and the passing are performed by one component running on the server, wherein the one component comprises the map-reduce query execution framework; and
wherein the one or more data nodes comprise a plurality of data nodes having a plurality of tables and indices distributed thereamong.

14. The computer storage medium of claim 13, wherein the method further comprises maintaining a tree model for the database, the tree model associating one or more data nodes with each block of data stored in the database, one or more blocks of data with each table included in the database, and one or more tables with the database.

15. A database query handling system comprising:
a plurality of data nodes;
a database query handling server communicatively connected to each of the plurality of data nodes, the database query handling server running:
  a parser component configured to parse a SQL database query to identify a database and on or more tables and columns identified by the SQL database query,
  a query planner component configured to determine a query plan based on the parsed SQL database query, the identified database, and the identified one or more tables and columns, the query planner component configured to determine a set of operations and an execution sequence of the set of operations used to perform the SQL database query;
  a database engine configured to, based on the query plan and the identified database, tables and columns, identify a set of data nodes implicated by the identified tables and columns from among the plurality of data nodes, and determine a set of map-reduce operations and one or more data nodes from the data nodes based on the identified set of data nodes at which the map-reduce operations are to be executed;
  a map-reduce query execution framework configured to distribute one or more of the map-reduce operations of the p query to the one or more of the data nodes based on the identified set of data nodes and the set of map-reduce operations by referencing IP addresses of the identified set of data nodes having relevant data, and to receive data from the one or more data nodes in response to at least one of the map-reduce operations,
wherein the one or more map-reduce operations correspond to an atomic set of operations that are performed at a data block level,
  wherein during map-reduced operations each data node of the one or more data nodes access different blocks of the data without sitting idle permitting each of the one or more data nodes to execute at a same time,
  wherein the database engine and the map-reduce query execution framework are part of one component running on the database query handling server; and
wherein the one or more data nodes comprise a plurality of data nodes having a plurality of tables and indices distributed thereamong.

16. The system of claim 15, wherein each of the plurality of data nodes stores a block of data and an index into the block of data.

17. The system of claim 16, wherein each block of data contains a plurality of records, with each block of data stored as a text file and each of the plurality of records stored as a line within the text file.

18. The system of claim 16, wherein the database engine includes a tree model defining a structure for the database, the tree model associating one or more data nodes with each block of data stored in the database, one or more blocks of data with each table included in the database, and one or more tables with the database.

19. The system of claim 16, wherein a data node from among the plurality of data nodes stores a plurality of text files, each text file of the plurality of text files associated with a data block of a different table in the database.

20. The system of claim 16, wherein the database engine is configured to return a result data set to a client application from which the SQL query is received.

* * * * *